(12) United States Patent
Wesley

(10) Patent No.: US 6,694,912 B2
(45) Date of Patent: Feb. 24, 2004

(54) THERMOCHROMIC INK SAFETY LABEL FOR CHAFING FUEL CANS AND METHODS OF MAKING THE SAME

(75) Inventor: John Wesley, Edison, NJ (US)

(73) Assignee: Blyth, Inc., Batavia, IL (US)

( * ) Notice: Subject to any disclaimer, the term of this patent is extended or adjusted under 35 U.S.C. 154(b) by 48 days.

(21) Appl. No.: 09/893,259

(22) Filed: Jun. 27, 2001

(65) Prior Publication Data

US 2003/0000450 A1 Jan. 2, 2003

(51) Int. Cl.$^7$ ................................................ G01D 21/00
(52) U.S. Cl. .................... 116/207; 116/216; 252/408.1; 252/962; 374/162
(58) Field of Search ................................ 116/207, 206, 116/216; 252/408.1 XF, 962 XF, 964; 374/162 XF, 157, 150, 208

(56) References Cited

U.S. PATENT DOCUMENTS

| | | | |
|---|---|---|---|
| 1,668,767 A | 5/1928 | Hanson | |
| 1,924,793 A | * 8/1933 | Laske | 106/287.18 |
| 2,216,127 A | 10/1940 | McNaught | 99/192 |
| 2,308,087 A | 1/1943 | Lappala | 73/356 |
| 2,379,459 A | 7/1945 | Schreiber et al. | 73/353 |
| 2,762,711 A | 9/1956 | Zopf, Jr. | 99/192 |
| 2,782,749 A | 2/1957 | Beckett et al. | 116/114 |
| 2,826,073 A | 3/1958 | Huyck et al. | 73/356 |
| 2,889,799 A | 6/1959 | Korpman | 116/114 |
| 2,955,942 A | 10/1960 | Fenity et al. | 99/192 |
| 3,002,385 A | 10/1961 | Wahl et al. | 73/356 |
| 3,311,084 A | 3/1967 | Edenbaum | 116/114 |
| 3,360,338 A | 12/1967 | Edenbaum | 23/253 |
| 3,561,269 A | * 2/1971 | Seitz | 374/162 |
| 3,774,450 A | 11/1973 | Godsey | 73/358 |
| 3,782,195 A | 1/1974 | Meek et al. | 73/343 |
| 3,844,718 A | 10/1974 | Cohen | 23/253 |

(List continued on next page.)

FOREIGN PATENT DOCUMENTS

| | | | |
|---|---|---|---|
| DE | 3836424 A1 | * | 7/1989 |
| GB | 2199981 A | * | 7/1988 |
| GB | 2310283 | * | 8/1997 |
| GB | 2 334 092 A | | 11/1999 |
| JP | 58026236 A | * | 2/1983 |
| JP | 02039077 A | * | 2/1990 |
| JP | 2001021977 A | * | 1/2001 |

*Primary Examiner*—Christopher W. Fulton
*Assistant Examiner*—Tania C. Courson
(74) *Attorney, Agent, or Firm*—Marshall, Gerstein & Borun LLP

(57) ABSTRACT

A safety label for use with chafing fuel cans capable of providing the user with information about the current physical characteristics of the can, including as they relate to temperature, employing the use of thermochromic materials dispersed within a media such as ink or paint. The thermochromic materials are capable of undergoing a sharp, reversible visible metachromism between the temperatures of −40° C. and 80° C. The method of manufacturing safety labels according to the invention include the steps of applying informational indicia on the safety label, and then covering such indicia with the media containing the thermochromic materials dispersed therein. When the chafing fuel can is ignited, the media with the thermochromic materials visually undergoes a metachromism, rendering the media invisible, thereby revealing the informational indicia applied with the non-thermochromic ink. After the chafing fuel can has been extinguished the temperature decreases, whereupon the media with the thermochromic material reappears, thereby, covering up again the informational indicia.

18 Claims, 5 Drawing Sheets

U.S. PATENT DOCUMENTS

| | | | |
|---|---|---|---|
| 4,028,118 A | 6/1977 | Nakasuji et al. | 106/21 |
| 4,105,583 A | 8/1978 | Glover et al. | 252/408 |
| 4,459,046 A * | 7/1984 | Spirg | 374/162 |
| 4,554,565 A | 11/1985 | Kito et al. | |
| 4,643,588 A | 2/1987 | Postle et al. | 374/160 |
| 4,693,920 A * | 9/1987 | Agarwal et al. | 428/40 |
| 4,743,557 A | 5/1988 | Tiru et al. | 436/2 |
| 4,987,849 A | 1/1991 | Sherman | 116/206 |
| 5,202,677 A * | 4/1993 | Parker et al. | 340/786 |
| 5,273,360 A | 12/1993 | Wyatt et al. | 374/141 |
| 5,464,968 A | 11/1995 | Germain et al. | 219/710 |
| 5,499,597 A * | 3/1996 | Kronberg | 116/216 |
| 5,688,592 A * | 11/1997 | Shibahashi et al. | 428/323 |
| 5,707,680 A | 1/1998 | Moore | 427/7 |
| 5,773,111 A * | 6/1998 | Brewster | 428/40.1 |
| 5,788,375 A | 8/1998 | Parker et al. | 374/162 |
| 5,928,803 A * | 7/1999 | Yasuda | 428/913 |
| 5,977,521 A | 11/1999 | Mehta et al. | |
| 6,048,572 A | 4/2000 | Shacklett, III et al. | 427/58 |

\* cited by examiner

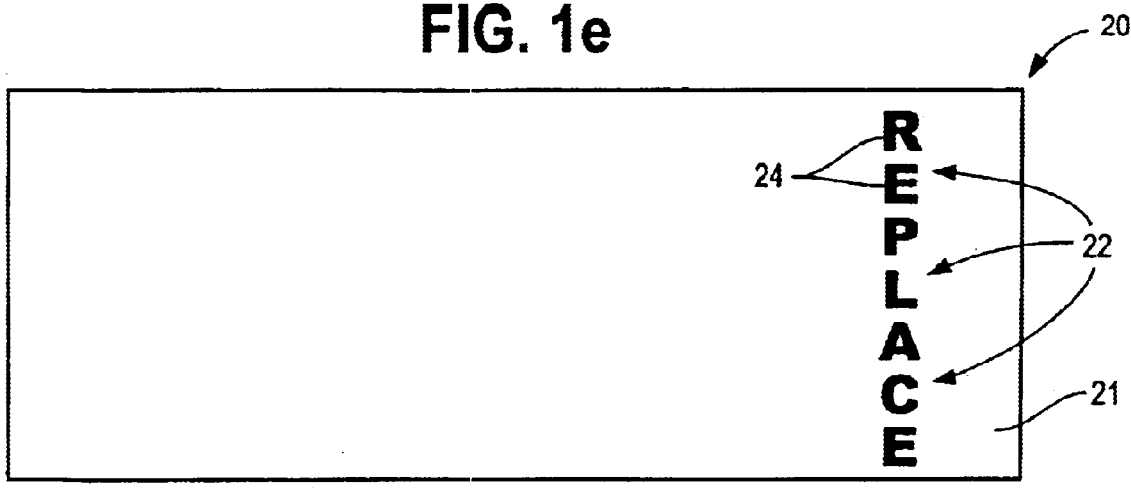
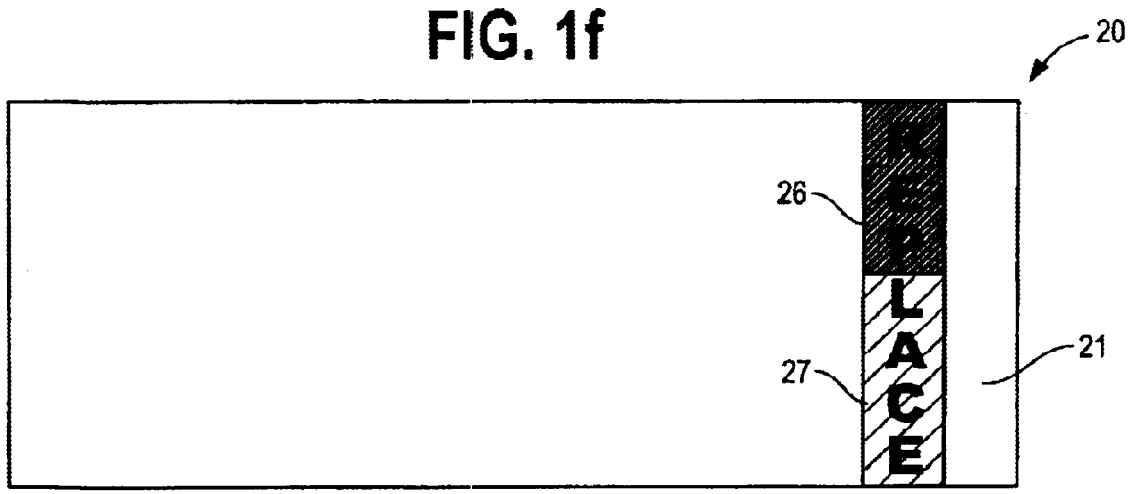

THERMOCHROMIC INK SAFETY LABEL FOR CHAFING FUEL CANS AND METHODS OF MAKING THE SAME

FIELD OF THE INVENTION

The present invention relates generally to safety labels for fuel cans for heating chafing dishes, such as gel chafing fuel cans, e.g. Sterno® type cans. More specifically, the present invention relates to labels for Sterno® type chafing fuel cans that indicate the physical characteristics of the cans as they relate to temperature. The safety label provides information to the end user about the characteristics of the chafing fuel can through the use of a thermochromic ink that undergoes a sharp, reversible visible metachromism in response to a particular temperature change. The present invention also relates to a method of manufacturing labels for chafing fuel cans which utilize thermochromic inks to provide visual information about the physical characteristics of the as they relate to temperature.

BACKGROUND OF THE INVENTION

Sterno® type and other similar chafing fuel cans are well known. These can heating elements typically are used for the heating of food inside of chafing dishes. Such chafing fuel cans are typically aluminum cans that are approximately two to three inches in height and have a retractable or removable lid. When the lid is removed, an ethanol fuel, a gel fuel, or other fuel disposed therein is exposed. This fuel, when ignited, provides an invisible flame (such as those associated with burning ethanol) that is capable of reaching temperatures of up to 500° F. (260°°C.). Chafing fuel cans of this type are popular with consumers because of their ability to continuously heat food products in chafing dishes, coffee carafes, or other containers over extended periods of time.

One problem with such chafing fuel cans of this type is that they may be associated with burn injuries. Such injuries are sometimes caused because the invisible nature of the fuel. Users are often unable to determine whether or not the fuel is actually burning.

Moreover, burn injuries may also occur after the flame of the heating element is extinguished. For example, several minutes after the flame is extinguished, the surface temperature of such chafing fuel cans often remain elevated to the point where skin burns can still occur. Users who are unaware that the flame was recently extinguished, may handle the can prematurely and thereby burn themselves. Furthermore, burn injuries associated with chafing fuel cans may also occur because the user is unaware of the level of the fuel inside of the can. The fuel disposed in such chafing fuel cans burns extremely hot at and above the surface level of the fuel in the can. However, just below the surface level of the fuel, the temperature of the chafing fuel can is low enough for the user to safely handle the can's exterior. Therefore, if the user is unaware of the level of the surface of the fuel within the chafing fuel can, accidental burn injuries may occur.

Another problem associated with the such chafing fuel cans is that there is currently no visual representation of the temperature at which the chafing can burns. The United States Food and Drug Administration requires that hot food be kept at or above 140° F. in open air chafing dishes in order to be in the heated "safe zone." When chafing dish food is kept above this temperature, a substantial amount of harmful bacteria is killed. Therefore, it would be advantageous to know whether or not the chafing fuel can is burning at or above 140° F.

Due to the inherent dangers associated with any such lighted chafing fuel cans, it would be desirous to design a safety label for such cans that is capable of providing information to the user about the temperature characteristics of the chafing fuel can. Such a safety label would prevent many burn injuries associated with such cans. Currently, no safety labels for Sterno® and other type chafing fuel cans are available that are capable of providing this type of information to the user.

SUMMARY OF THE INVENTION

The invention satisfies the needs noted here by providing a safety label that is capable of visibly providing users of Sterno® and other type chafing fuel cans with a variety of information about the current physical characteristics of the cans as they relate to temperature. Thus, safety labels made in accordance with the invention will work to prevent burn injuries associated with chafing fuel cans by providing a visual indication of the actual elevated temperatures present with the cans. The visual indication on the present safety label is achieved through the use of a media such as an ink or paint with thermochromic materials dispersed therein.

Thermochromic materials that undergo sharp, reversible visual metachromism in response to temperature changes are known in the art. For example, U.S. Pat. No. 4,028,118 issued to Nakasuji et al. discloses such a material. Typically, these materials contain, as indispensable components, an electron-donating, chromatic organic compound, a compound having a phenolic hydroxyl group, and a compound selected from the group consisting of higher aliphatic monatomic alcohols and higher aliphatic monatomic acid alcohol esters.

In accordance with a fundamental aspect of this invention, there is provided a safety label for use with Sterno® and other type chafing fuel cans. The safety label contains at least one portion that includes media with thermochromic material dispersed therein. The media with thermochromic materials is capable of reversibly undergoing visible metachromism as it is exposed to increased temperatures, and returning to its original color as the temperature decreases, thereby permitting use as a safety indication of increased temperatures.

BRIEF DESCRIPTION OF THE DRAWINGS

Other aspects of the disclosed product and method will become apparent from the following descriptions of the embodiments with reference to the accompanying drawings, in which:

FIGS. 1a–1f illustrate several different embodiments of the present chafing fuel can safety label;

DETAILED DESCRIPTION OF THE INVENTION

Accordingly the invention satisfies the needs noted above by providing a safety label for Sterno® and other type chafing fuel cans that is capable of visually providing information to the user about the physical characteristics of the chafing can. Therefore, labels made in accordance to this invention may be marketed to consumers as "safety" labels due to the fact that they can work to prevent serious burn injuries.

The safety indicating features of the chafing fuel can labels are provided through thermochromic materials disposed in a media such as printing inks or paints. Such materials are capable of exhibiting a sharp and reversible visual metachromism at temperatures within a range of −40° F.(−40° C.) and 500° F. (260° C.). For example, a preferred range is 120° F. (49° C.) to 130° F. (54° C.). The thermochromic material is formed form (A) an electron-donating, chromatic organic compound; (B) a compound containing a phenolic hydroxyl group; (C) a compound selected from the group consisting of higher aliphatic monovalent acid alcohol esters. This basic thermochromic material is then microencapsulated and dissolved or dispersed in printing ink or other media.

Figure 1A:
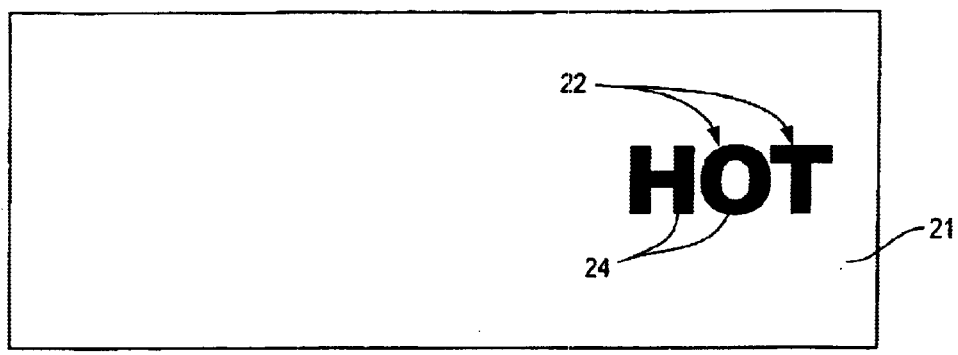
Figure 1B:
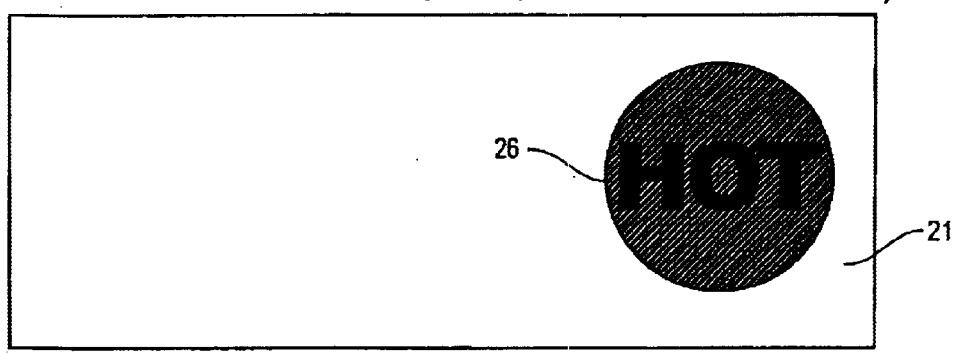
Figure 1C:
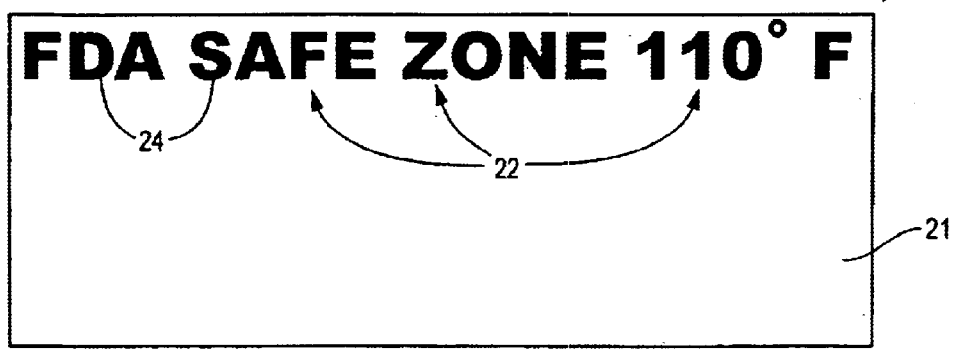
Figure 1D:
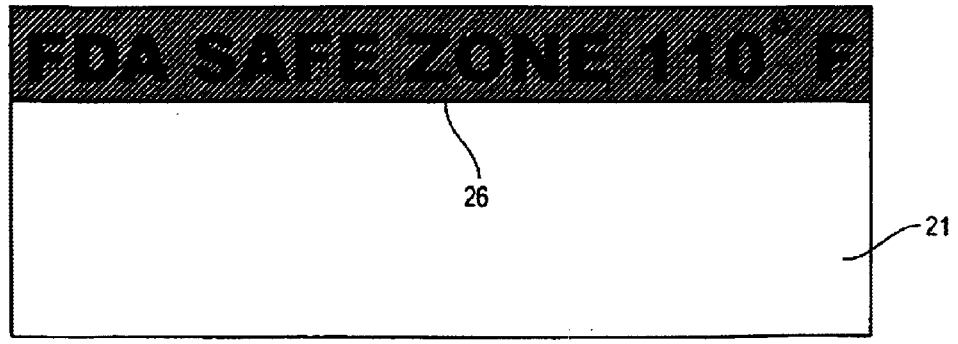

As shown in FIGS. 1a, 1c and 1e, the method of producing safety labels 20 for chafing fuel cans includes applying informational indicia 22 such as words or symbols on the label substrate 21 using a non-thermochromic material 24. These indicia 22 may be an indication of warning or they may provide information. The indicia 22 are then covered by a media with thermochromic materials 26 dispersed therein. Preferably the media with the thermochromic material 26 is of opaque color as seen in FIGS. 1b, 1d and 1f.

Figure 2A:
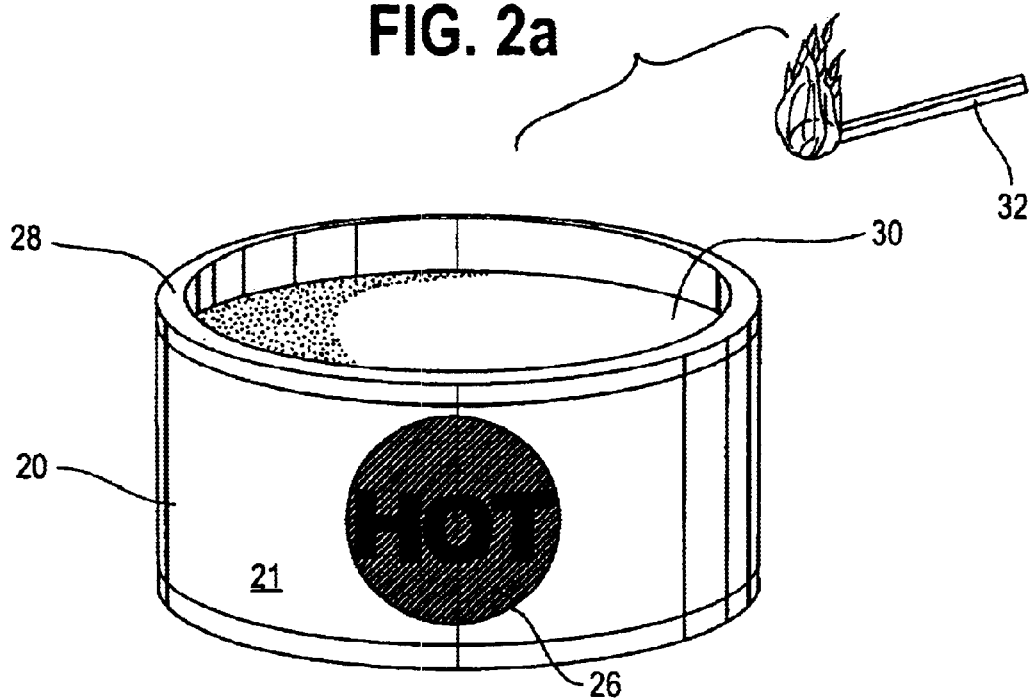
FIGS. 2a and 2b illustrate a chafing fuel can employing the safety label.
Figure 2B:
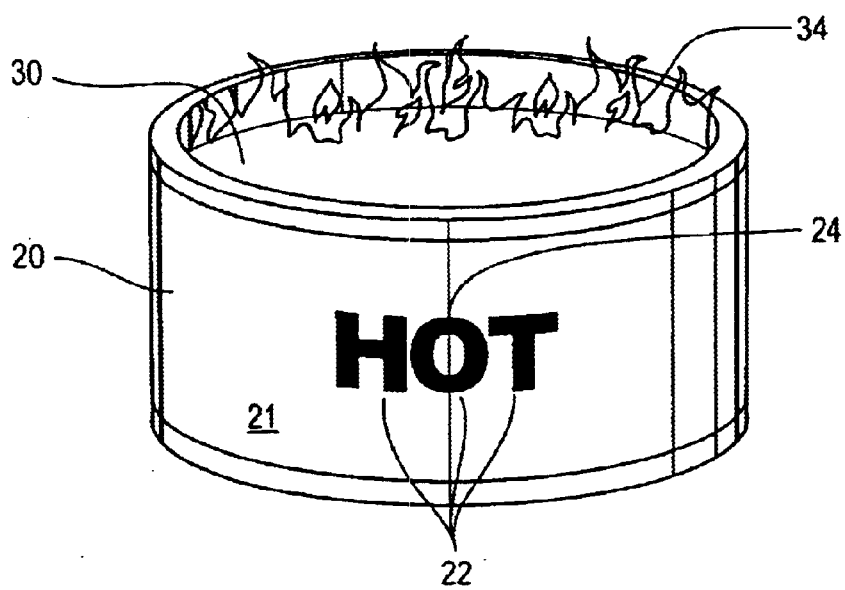

FIGS. 2a and 2b show the safety label 20 in operation on a chafing fuel can 28. According to its intended use, the safety label 20 is placed on a chafing fuel can 28. Typically, the can 28 contains gelled ethanol or some other type of fuel 30. When the fuel 30 is ignited with a match 32 or other flame means for ignition, the fuel 30 burns with invisible flames 34. As the fuel 28 burns, the heat from the chafing fuel can 28 can reach temperatures of up to 500° F. (260° C.). As these temperatures are approached, the thermochromic materials 26 dispersed throughout the media undergo a sharp reversible visual metachromism thereby rendering the media invisible and simultaneously revealing the underlying words of warning 22 that were previously covered by the media with the thermochromic material 26. This, in turn, provides a visual indication of the elevated temperature of the chafing fuel can 28.

As shown in the different embodiments of FIGS. 1a–1f, the informational indicia 22 that are chosen can be placed on the label 20 in a variety of different locations. Moreover, these indicia 22 can provide various types of safety and other information to the user of the chafing fuel can 28. For example, in FIG. 1e indicia 22 indicating that it is time to replace the can 28 because the fuel 30 has been consumed can be placed on the label 20 vertically using media with non-thermochromic material 24. The informational indicia 22 are then covered by media with thermochromic materials 26 disposed therein, as shown in FIG. 1f. In this embodiment, the safety label 20 will indicate the level of the fuel 30 in the can 28. When the fuel 30 is ignited, the thermochromic materials 26 within the media will undergo the visual metachromism at and above the level of the fuel 30 thereby indicating where a user can safely handle the exterior of the chafing fuel can 28. Moreover, as the fuel 30 is consumed, the user will know when to replace the chafing fuel can 28 with a fresh one. Additionally, as a further modification to this embodiment as seen in FIG. 1f, another or second thermochromic material 27 may be used on the label 20 to cover the informational indicia 22. (Although depicted for visual clarity in FIG. 1f as a different color from the thermochromic material 26, preferably, the second thermochromic material 27 should be of the same color of the first thermochromic material 26.) The second thermochromic material 27 may be selected such that it undergoes reversible metachromism at a temperature that is different than that of the first thermochromic material 26. In this manner, different portions of the label 20 will undergo metachromism at different temperatures, thereby revealing the informational indicia 22 at different times as necessary.

For example, at 49° C. the first thermochromic material could reveal the warning message "HOT! CAUTION!" After one hour into the burn cycle, the temperature may reach 182°°C. At that point, the second thermochromic material could reveal the message "EXTREMELY HOT!". Moreover, if desired, a third or even a fourth thermochromic material may be utilized on the label.

Figure 3A:
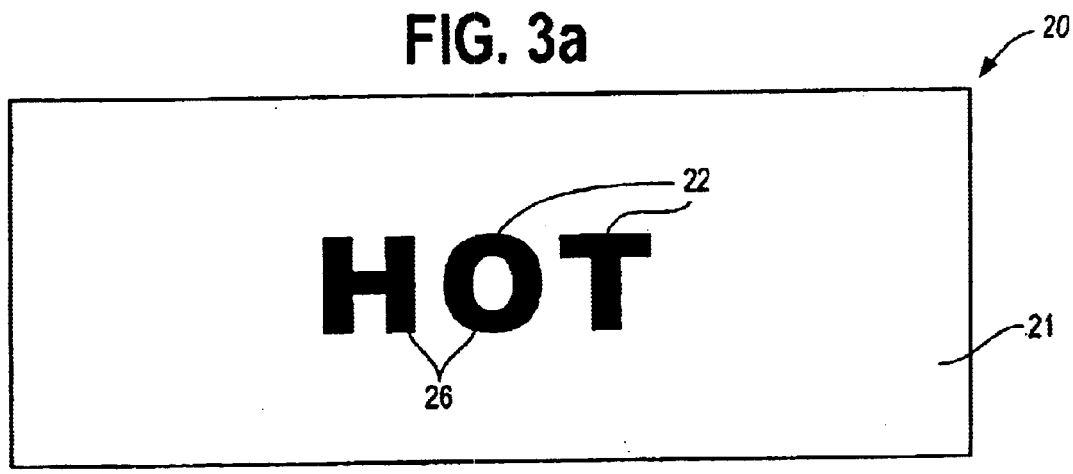
FIGS. 3a and 3b illustrate the steps of producing an alternate embodiment of the safety label according to the invention.
Figure 3B:
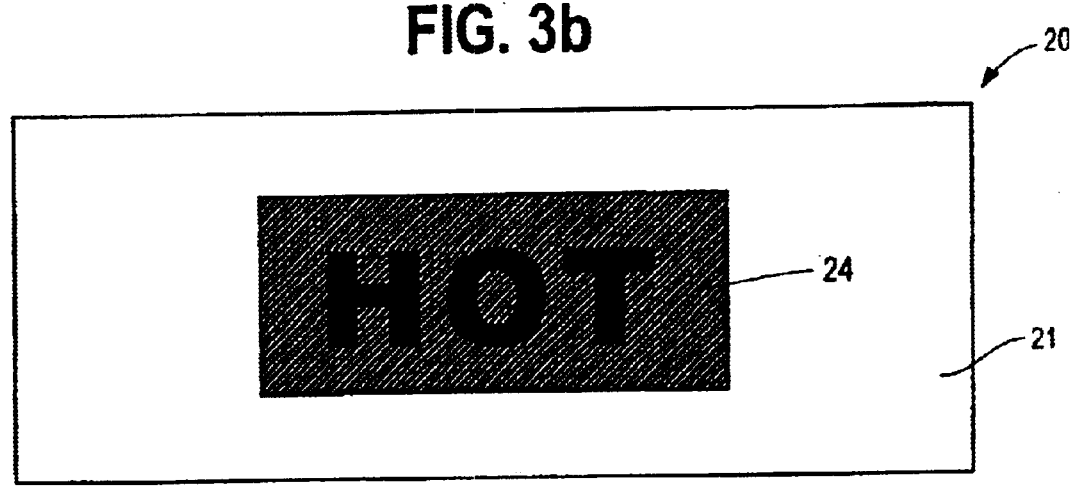
Figure 3C:
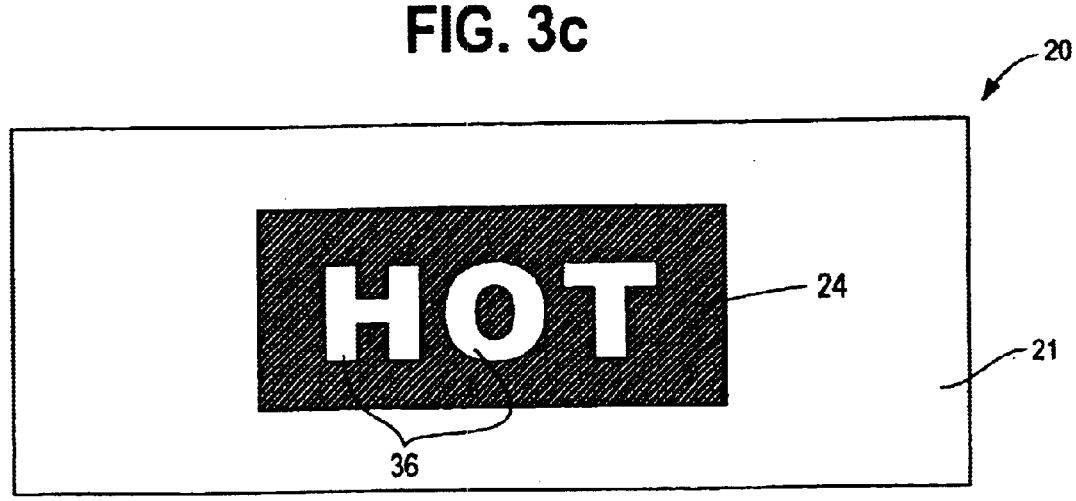
FIG. 3c illustrates the embodiment of FIGS. 3a and 3b exposed to increased temperature.

In yet another embodiment, shown in FIGS. 3a and 3b, a safety label 20 according to the invention is produced by applying the informational indicia 22 on the label substrate 21 using a media with a thermochromic material 26 disposed therein. The next step is to apply a non-thermochromic media 24 to the label substrate 21. The non-thermochromic media 24 is applied to the label substrate 21 in such a way that it abuts the outline 36 of the informational indicia 22 but does not cover it. Preferably, the media containing the thermochromic material 26 and the non-thermochromic media 24 are substantially the same color. Therefore, as seen in FIG. 3c, when the safety label 20 is exposed to increased temperature, the informational indicia 22 applied with the thermochromic material 26 undergoes a visible metachromism rendering them invisible. When this happens, the outline 36 of the informational indicia 22 where the media with the thermochromic material 26 abuts the non-thermochromic media 24 is visible. In this manner, the information about the chafing fuel can is visually conveyed to the user.

In yet another embodiment, shown in FIGS. 3a and 3b, a safety label 20 according to the invention is produced by applying the informational indicia 22 on the label substrate 21 using a media with a thermochromic material 26 disposed therein. The next step is to apply a non-thermochromic media to the label substrate 21. The non-thermochromic media is applied to the label substrate 21 in such a way that it abuts the outline 36 of the informational indicia 22 but does not cover it. Preferably, the media containing the thermochromic material 26 and the non-thermochromic media 24 are substantially the same color. Therefore, as seen in FIG. 3c, when the safety label 20 is exposed to increased temperature, the informational indicia 22 applied with the thermochromic material 26 undergoes a visible metachromism rendering them invisible. When this happens, the outline 36 of the informational indicia 22 where the media with the thermochromic material 26 abuts the non-thermochromic media is visible. In this manner, the information about the chafing fuel can is visually conveyed to the user.

Figure 4A:
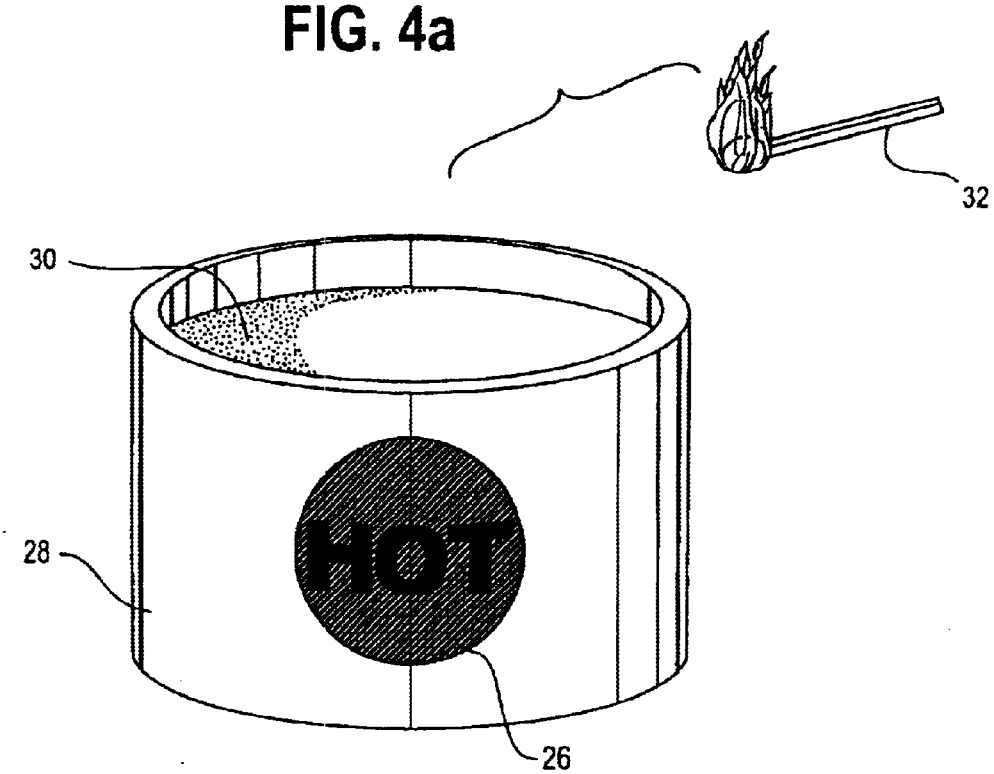
FIGS. 4a and 4b illustrates an alternative embodiment of the invention wherein the safety label is applied directly to the chafing fuel can.
Figure 4B:
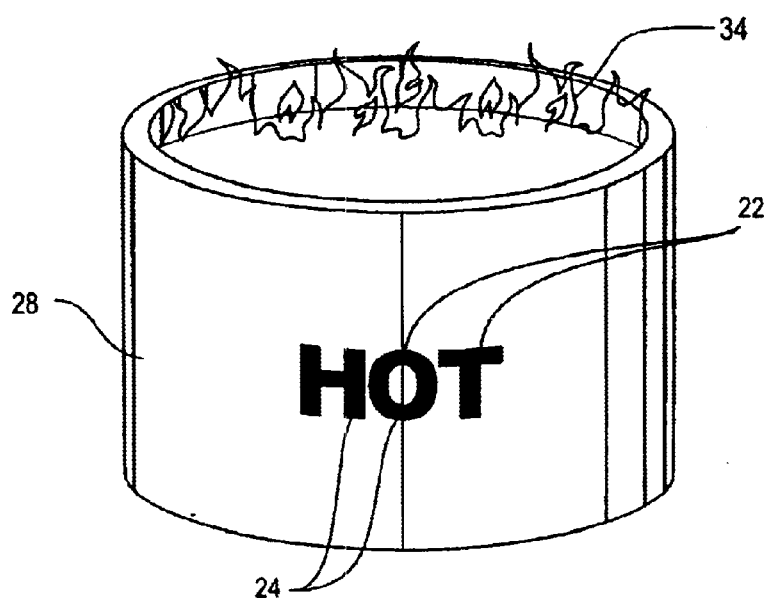

In still a further embodiment, as seen in FIGS. 4a and 4b, the informational indicia 22 are applied directly to the surface of the chafing fuel can 28. Thereafter, the informational indicia 22 is covered up with media 26 that includes a thermochromic material dispersed therein. When the fuel 30 is ignited by a match 32 or similar flame source, an invisible flame 34 raises the temperature of the chafing fuel can 28. As the temperature of the chafing fuel can 28 is raised, the media with the thermochromic material 26 disposed therein undergoes a visible metachromism thereby revealing the informational indicia 22.

Additionally, an obvious variation of the invention, (not shown), would be to combine the embodiments of FIGS. 3a–3c with FIGS. 4a and 4b. In this embodiment, the informational indicia 22 would be applied directly to the chafing fuel can 28 using a media with a thermochromic material 26 disposed therein. The next step would be to apply a non-thermochromic media 24 directly to the chafing fuel can 28 such that the non-thermochromic media 24 abuts the outline 36 of the media with the thermochromic material 26.

While the invention has been described in detail and with reference to specific embodiments thereof, it will be apparent to one skilled in the art that various changes and modifications can be made therein without departing from the spirit and scope thereof.

We claim:

1. A chafing fuel container comprising:
    at least one metallic side and a metallic bottom defining an interior space;
    a combustible hydrocarbon chafing fuel disposed within the interior space that when ignited raises the temperature of the outside surface of the at least one metallic side to a point where burns would occur if the container were handled by unprotected skin;
    a label attached to the outer surface of the container having a heat and combustion indicator to provide information about the temperature of the outer surface of the container wherein the heat and combustion indicator is made from at least one thermochromic material that reversibly undergoes metachromism when exposed to increased temperatures and returns to its original color when exposed to decreased temperatures.

2. A chafing fuel container according to claim 1, wherein said heat and combustion indicator further comprises a second thermochromic material that reversibly undergoes metachromism when exposed to increased temperatures and returns to its original color when exposed to decreased temperature.

3. A chafing fuel container according to claim 2, wherein said second thermochromic material undergoes metachromism at a temperature different from that of the at least one thermochromic material.

4. A chafing fuel container according to claim 1 wherein the thermochromic material on the label is an ink.

5. A chafing fuel container according to claim 1 wherein the thermochromic material on the label is a paint.

6. A chafing fuel container according to claim 1, wherein said label further comprises informational indicia depicted in non-thermochromic material.

7. A chafing fuel container according to claim 6, wherein said informational indicia depicted in non-thermochromic material is covered by the thermochromic material.

8. A chafing fuel container according to claim 1, wherein said label informational indicia depicted in thermochromic material.

9. A chafing fuel container according to claim 8, wherein the outline of said informational indicia is abutted by non-thermochromic material.

10. A chafing fuel container comprising:
    at least one metallic side and a metallic bottom defining an interior space;
    a combustible hydrocarbon chafing fuel disposed within the interior space that when ignited raises the temperature of the outside surface of the at least one metallic side to a point where burns would occur if the container were handled by unprotected skin;
    a heat and combustion indicator applied directly to the outer surface of the container to provide information about the temperature of the outer surface of the container wherein the heat and combustion indicator is made from at least one thermochromic material that reversibly undergoes metachromism when exposed to increased temperatures and returns to its original color when exposed to decreased temperatures.

11. A chafing fuel container of claim 10, further comprising a second thermochromic material applied directly to the outer surface of the container that reversibly undergoes metachromism when exposed to increased temperatures and returns to its original color when exposed to decreased temperature.

12. A chafing fuel container according to claim 11, wherein said second thermochromic material undergoes metachromism at a temperature different from that of the at least one thermochromic material.

13. A chafing fuel container according to claim 10, wherein the thermochromic material applied directly to the outer surface of the container is an ink.

14. A chafing fuel container according to claim 10, wherein the thermochromic material applied directly to the outer surface of the container is a paint.

15. A chafing fuel container according to claim 10, further comprising informational indicia depicted in non-thermochromic material applied directly to the outer surface of the container.

16. A chafing fuel container according to claim 15, wherein said informational indicia formed of non-thermochromic material are covered by the thermochromic material.

17. A chafing fuel container according to claim 10, further comprising informational indicia depicted in thermochromic material applied directly to the outer surface of the container.

18. A chafing fuel container according to claim 17, wherein the outline of said informational indicia depicted in thermochromic material is abutted by non-thermochromic material.

* * * * *

UNITED STATES PATENT AND TRADEMARK OFFICE
CERTIFICATE OF CORRECTION

PATENT NO. : 6,694,912 B2
DATED : February 24, 2004
INVENTOR(S) : John N. Wesley Page 1 of 1

It is certified that error appears in the above-identified patent and that said Letters Patent is hereby corrected as shown below:

Column 5,
Line 55, delete "label informational" and insert -- label further comprises informational --.

Signed and Sealed this

Fifteenth Day of June, 2004

JON W. DUDAS
*Acting Director of the United States Patent and Trademark Office*